(12) United States Patent
Pekonen et al.

(10) Patent No.: US 8,181,095 B2
(45) Date of Patent: May 15, 2012

(54) SYSTEM AND METHOD FOR IMPROVING SIGNALING CHANNEL ROBUSTNESS

(75) Inventors: Harri J. Pekonen, Raisio (FI); Heidi Himmannen, Turku (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 12/239,091

(22) Filed: Sep. 26, 2008

(65) Prior Publication Data

US 2009/0164873 A1 Jun. 25, 2009

Related U.S. Application Data

(60) Provisional application No. 60/976,225, filed on Sep. 28, 2007.

(51) Int. Cl.
*H03M 13/00* (2006.01)
(52) U.S. Cl. ........................................ 714/776; 714/779
(58) Field of Classification Search .................. 714/776, 714/779
See application file for complete search history.

(56) References Cited

U.S. PATENT DOCUMENTS

| 6,522,665 | B1 * | 2/2003 | Suzuki et al. ................. 370/471 |
| 6,782,035 | B1 * | 8/2004 | Nakamura et al. ............ 375/130 |
| 6,804,257 | B1 | 10/2004 | Benayoun et al. |
| 7,012,882 | B2 * | 3/2006 | Wang et al. ................... 370/208 |
| 7,333,573 | B2 * | 2/2008 | Higure .......................... 375/344 |
| 2006/0165128 | A1 * | 7/2006 | Peake et al. ................... 370/503 |
| 2006/0195752 | A1 | 8/2006 | Walker et al. |

OTHER PUBLICATIONS

International Search Report for PCT Application No. PCT/IB2008/053872 mailed Mar. 24, 2009.
Office Action for EP Patent Application No. 08807775.5, dated Jul. 12, 2011.

* cited by examiner

*Primary Examiner* — M. Mujtaba K Chaudry
(74) *Attorney, Agent, or Firm* — Banner & Witcoff, Ltd.

(57) ABSTRACT

A system and method for improving signaling channel robustness. Additional error correction is provided for (L1) dynamic signaling that is carried in P2 symbols in such way that high time diversity can be provided. In other embodiments, transmitted services are scheduled such that services will rotate or "move" between frames, thereby ensuring that a first slot for a service is not always transmitted in the same frequency.

20 Claims, 9 Drawing Sheets

SYSTEM AND METHOD FOR IMPROVING SIGNALING CHANNEL ROBUSTNESS

CROSS-REFERENCE TO RELATED PATENT APPLICATIONS

This application claims priority from Provisional Application U.S. Application No. 60/976,225, filed Sep. 28, 2007, incorporated herein by reference in its entirety.

FIELD OF THE INVENTION

The present invention relates generally to communications networks. More particularly, the present invention relates to the signaling of data over multiple channels in a communication network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital broadband broadcast networks enable end users to receive digital content including video, audio, data, etc. Using a portable, mobile or fixed terminal, a user may receive digital content over a wireless digital broadcast network. Digital content can be transmitted in a cell within a network. A cell may represent a geographical area that may be covered by a transmitter in a communication network. A network may have multiple cells and cells may be adjacent to other cells.

In the Digital Video Broadcasting (DVB)-T2 standard, a method has been proposed for transmitting data over several separate radio frequency (RF) channels. In the method, data path error resiliency is improved because error correction is performed over several RF channels that are independent on each other.

In systems such as DVB-T2, two pilot symbols P1 and P2 are defined to enable fast channel searching and service discovery within the frame. Furthermore, for the carriage of Open Systems Interconnection (OSI) layer 1, physical layer (L1) and frame specific information within the P2 symbol, a P2-1 packet structure is defined. In addition to the L1 and frame specific information, the P2-1 packet may also carry OSI layer 2, data link layer (L2) signaling information (e.g. Program Specific Information/Service information (PSI/SI)) or data of the actual services.

The pilot symbol P1 may enable a fast initial scan for signals. The pilot symbol P1 may also be used to signal FFT-size and frequency offset to a receiver in the initial signal scan. In addition, the pilot symbol P1 may be used to assist in coarse frequency and coarse time synchronization of the receiver.

The pilot symbol P2 may be used for coarse and fine frequency synchronization and time synchronization in addition to initial synchronization achieved with pilot symbol P1. Moreover, the pilot symbol P2 may also carry L1 signaling information which may describe the physical parameters of the transmission and the construction of the TFS-frame. Furthermore, the pilot symbol P2 may provide an initial channel estimate, which may be needed to decode information in the P2 symbol and together with scattered pilots, the information in the first data symbols in the frame. Finally, the pilot symbol P2 may provide a channel for carrying L2 signaling information.

In the proposed DVB-T2, time frequency slicing (TFS)-related dynamic signaling is proposed to be transmitted in P2 synchronization symbols. In this arrangement, each TFS frame contains one or a limited number of P2 symbols that carry information regarding how a receiver can find desired services from the following frame. In the current proposal, dynamic signaling carried in P2 symbols is one of the key elements. However, it has been noticed that the dynamic signaling may not be sufficiently robust. Because reception without signaling is not possible, signaling robustness must be guaranteed to be better than data path robustness.

In order to improve dynamic signaling robustness, it is possible include parts of the dynamic signaling data in conjunction (i.e., being co-scheduled) with the actual data so that, when a receiver is following a service, dynamic signaling data for the received service from the same place is reduced. However, this implementation suffers from the fact that that providing co-scheduled signaling would include information about only the one service that is transmitted with the signaling. This is because, if all co-scheduled signaling contained information of all services, then required signaling capacity would be multiplied by the number of transmitted services. As such, in this arrangement, improved robustness does not result in the channel-switching scenario where the receiver needs to rely on the signaling provided only via P2 symbols.

SUMMARY

Various embodiments provide a system and method for improving signaling channel robustness. According to various embodiments, additional error correction is provided for (L1) dynamic signaling that is carried in P2 symbols in such way that high time diversity can be provided by calculating the error correction over multiple separate P2 symbols. In various embodiments, error correction data is transmitted prior to and/or with the frame in which the actual P2 symbols is carrying signaling information. In other embodiments, which may be implemented separate from or in conjunction with the embodiments discussed above, transmitted services are scheduled such that services will rotate or "move" between frames, thereby ensuring that a first slot for a service is not always transmitted in the same frequency. With the various embodiments, P1/P2 symbols can be received from different frequencies in different frames, thereby leading to frequency diversity. This arrangement also provides for an increased level of L1 dynamic signaling robustness, as both time and frequency diversity can be provided.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments provide a system and method for improving signaling channel robustness. According to various embodiments, additional error correction is provided for (L1) dynamic signaling that is carried in P2 symbols in such way that high time diversity can be provided by calculating the error correction over multiple separate P2 symbols. In various embodiments, error correction data is transmitted prior to and/or with the frame in which the actual P2 symbols is carrying signaling information. In other embodiments, which may be implemented separate from or in conjunction with the embodiments discussed above, transmitted services are scheduled such that services will rotate or "move" between frames, thereby ensuring that a first slot for a service is not always transmitted in the same frequency. With the various embodiments, P1/P2 symbols can be received from different frequencies in different frames, thereby leading to frequency diversity. This arrangement also provides for an increased level of L1 dynamic signaling robustness, as both time and frequency diversity can be provided.

Figure 1:
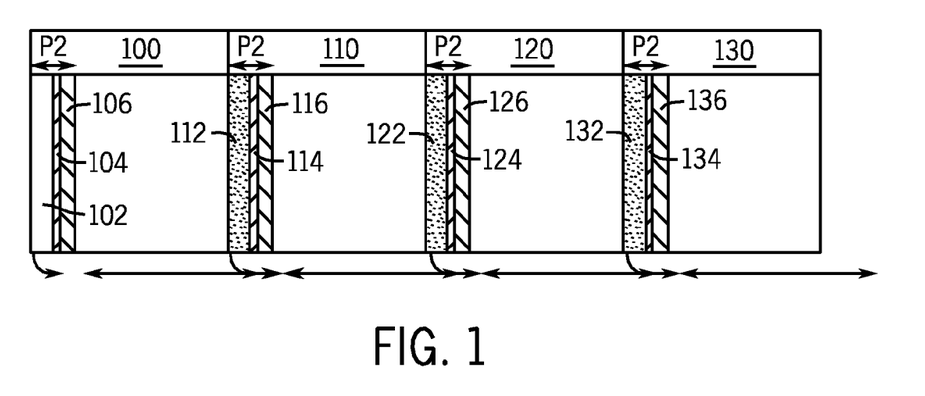
FIG. 1 is a representation showing the dynamic signaling of error correction data in a single-frequency case according to a particular embodiment.

FIG. 1 is a representation showing the dynamic signaling of error correction data in P2 symbols in a single-frequency case according to a particular embodiment. It should be noted that, in FIG. 1 and elsewhere herein, the P2 symbols are depicted as having separate portions for the actual data transmitted therein and parity bits or other generated error correction data. However, one skilled in the art would understand that the P2 symbols may have the actual data and parity bits interleaved with each other. It should also be noted that in various embodiments, each frame may have several P2 symbols, with each P2 symbol carrying different actual data and/or error correction data.

In FIG. 1, it is shown how individual P2 symbols in first, second, third and fourth frames 100, 110, 120 and 130 contain both signaling data and error correction data. In the first frame 100, there is first frame signaling data 102, first frame error correction data—first portion 104 and first frame error correction data—second portion 106. In the second frame 110, there is second frame signaling data 112, second frame error correction data—first portion 114 and second frame error correction data—second portion 116. In the third frame 120, there is third frame signaling data 122, third frame error correction data—first portion 124 and third frame error correction data—second portion 126. In the fourth frame 130, there is fourth frame signaling data 132, fourth frame error correction data—first portion 134 and fourth frame error correction data—second portion 136. For each piece of frame data, error correction data is provided in the P2 symbol of the two frames preceding the frame where the frame data exists. For example, for the third frame data 122 in the third frame 120, the error correction data for the third frame 120 is transmitted in the first frame 100 (as the first frame error correction data—first portion 104) and in the second frame 110 (as the second frame error correction data—second portion 116). As a result of this arrangement, time diversity is introduced over three frames—namely the first frame 100, the second frame 110 and the third frame 120—for the P2 dynamic signaling data for the third frame 120.

In certain implementations, it may be desirable to select an error correction for P2 signaling that is more robust than what is used for data. For example, if the code rate for a data path is ½, then it may be desirable to use code rate of ⅓ for signaling. A code rate of ⅓ means that for each byte of actual data, two (2) bytes of error correction data is generated. The error correction data, as well as the actual data, may be sent in parts.

Figure 2:
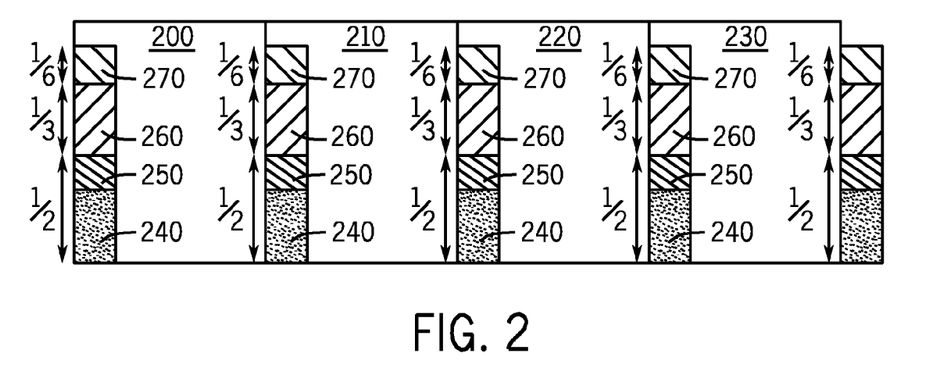
FIG. 2 shows an example of how P2 symbols can be divided to carry L1 dynamic data for different frames.

FIG. 2 is a representation of such an example scenario where a total code rate of ⅓ is used for signaling. In FIG. 2, the fractions depict the portions of total data (including actual data and error correction data) that is sent in the frame at issue. In the scenario depicted in FIG. 2, for each of the first, second third and fourth data frames 200, 210, 220 and 230, there is signaling data 240 and first, second and third error correction data 250, 260 and 270. The respective portions of error correction data carry parity information. The illustrated portions in the first, second, third and fourth data frames 200, 210, 220 and 230 contain signaling data and data correction information for a particular code word. For the code word for the third frame 220, dynamic signaling data is transmitted as follows. In the first frame 200, ⅙ of the total code word is transmitted. In the second frame 210, ⅓ of the total code word is transmitted. In the third frame 220, the final ½ of the total code word is transmitted. In this example, only error correction data is transmitted in the first frame 200 (via the third error correction data 270) and the second frame (via the second error correction data 260), while in the third frame 220 contains the signaling data 240 and error correction data (in the first error correction data 250). As additional frames are processed by the receiver, the overall level of robustness of the processed signals increases. Assuming that a receiver begins reception at the first frame 200, after the reception of the first P2 symbol, a code rate ⅔ for the next L1 frame dynamic data (corresponding to the signaling data 240 in the first frame 200) is provided, as the receiver by this point has received two bytes of actual data per one bit of error correction data for the signaling data 240. After receiving the second P2 symbol, a code rate of ⅗ for the next frame L1 dynamic data (corresponding to the signaling data 240 in the second frame 210) is provided. After receiving the third P2 symbol, a code rate of ⅓ for the next frame L1 dynamic data (corresponding to the signaling data 240 in the third frame 220) is provided.

Figure 3:
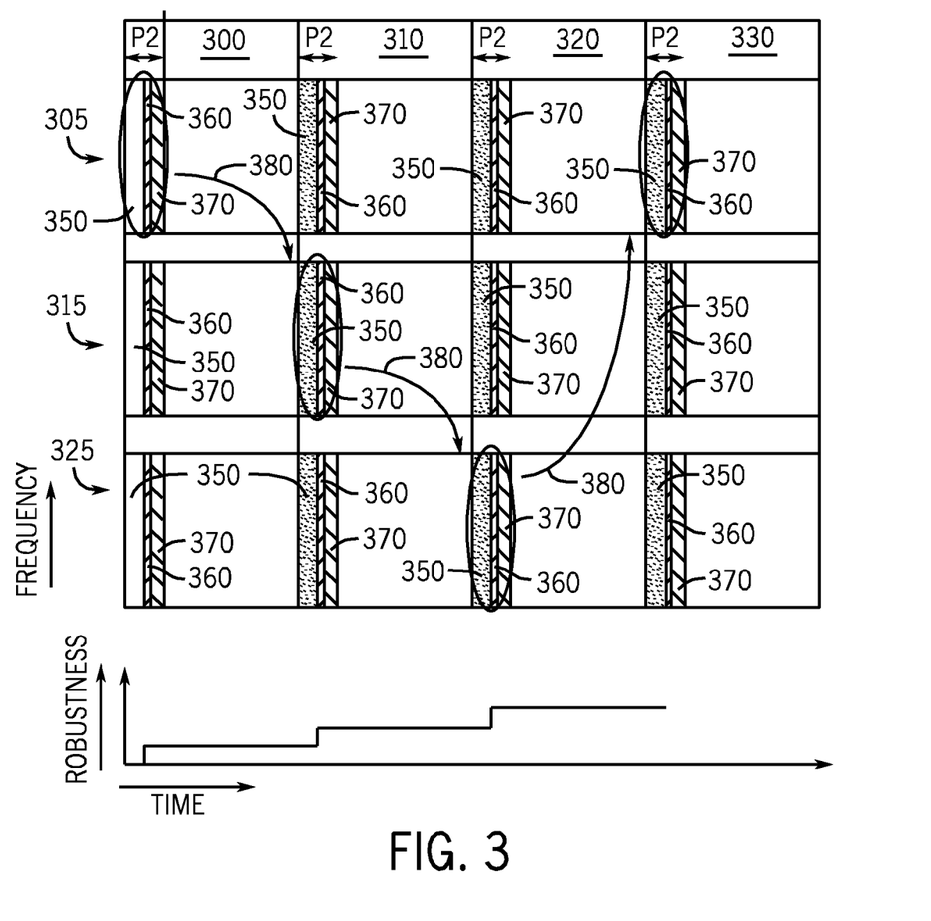
FIG. 3 is a representation of an example showing the transmittal of dynamic signaling data and error correction information in a three-frequency situation, along with an illustration of how a receiver hops among frequencies to receive P2 symbols.

FIG. 3 is a representation of an example showing the transmittal of dynamic signaling data and error correction information in a three-frequency situation, along with an illustration of how a receiver hops among frequencies to receive P2 symbols. In FIG. 3, error correction for L1 dynamic data is transmitted in P2 symbols for two previous frames before the frame containing the actual signaling data. For the signaling data at issue, no error correction data is transmitted in the same frame as where the signaling data resides in this particular embodiment.

In FIG. 3, a first frame 300, a second frame 310, a third frame 320 and a fourth frame 330 are depicted, with data being transmitted at a first frequency 305, a second frequency 315 and a third frequency 325. For the P2 symbols in the first, second, third and fourth frames 300, 310, 320, and 330, there is included signaling data 350, a first error correction data 360 and a second error correction data 370. Receiver hopping among frequencies, and the receiving of P2 symbols among different frequencies is also depicted, with the path taken by a receiver being represented at 380.

Reception begins for the receiver at the first frame 300 and at the first frequency 305 in FIG. 3. At this point, the receiver obtains signaling data 350 for the first frame 300, as well as first error correction data 360 (for the third frame 320) and second error correction data 370 (for the second frame 310). It should be noted that the receiver may also receive data normally from the first frame 300 (and subsequent frames), but this is not depicted in FIG. 3 for simplicity reasons. It should also be noted that, as is the case in the system depicted in FIG. 2, error correction data for the first frame 300 could also be provided in the first frame if necessary or desired.

After receiving the data in the first frame 300, the receiver then hops to the second frequency 315 for the second frame 310. At the second frame 310 at the second frequency 315, the receiver receives signaling data 350 for the second frame 310, as well as first error correction data 360 (for use with the fourth frame 330) and second error correction data 370 (for use with the third frame 320). At this point, the receiver can use the signaling data 350 directly from the second frame 310. However, if the signaling data 350 in the second frame 310 possessed some errors, then the receiver has the ability to use the second error correction data 370 that was received from the first frame 300. Because this piece of error correction data is available, the system is more "robust" at the second frame 310 than it was at the first frame 300, and this is demonstrated by the robustness/time comparison at the bottom of FIG. 3.

After receiving the data in the third frame 320, the receiver then hops to the third frequency 325 for the third frame 320. At the third frame 320 at the third frequency 325, the receiver receives signaling data 350 for the third frame 320, as well as first error correction data 360 (for use with the fifth frame, which is not shown) and second error correction data 370 (for use with the fourth frame 330). At this point, the receiver can use the signaling data 350 directly from the third frame 320. However, if the signaling data 350 in the third frame 320 possessed some errors, then the receiver has the ability to use both the second error correction data 370 that was received from the second frame 310 and the first error correction data 360 that was received from the first frame 300. With these two pieces of error correction data is available, the system is even more "robust" at the third frame 320 than it was at the second frame 310, and this is demonstrated by the robustness/time comparison at the bottom of FIG. 3. Moving to the fourth frame 330 (at which point the receiver returns to the first frequency 305) and beyond, by this point the receiver will always have the signaling data 350, the first error correction data 360 and the second error correction data 370 for each code word, providing a highest level of robustness according to various embodiments.

Figure 4:
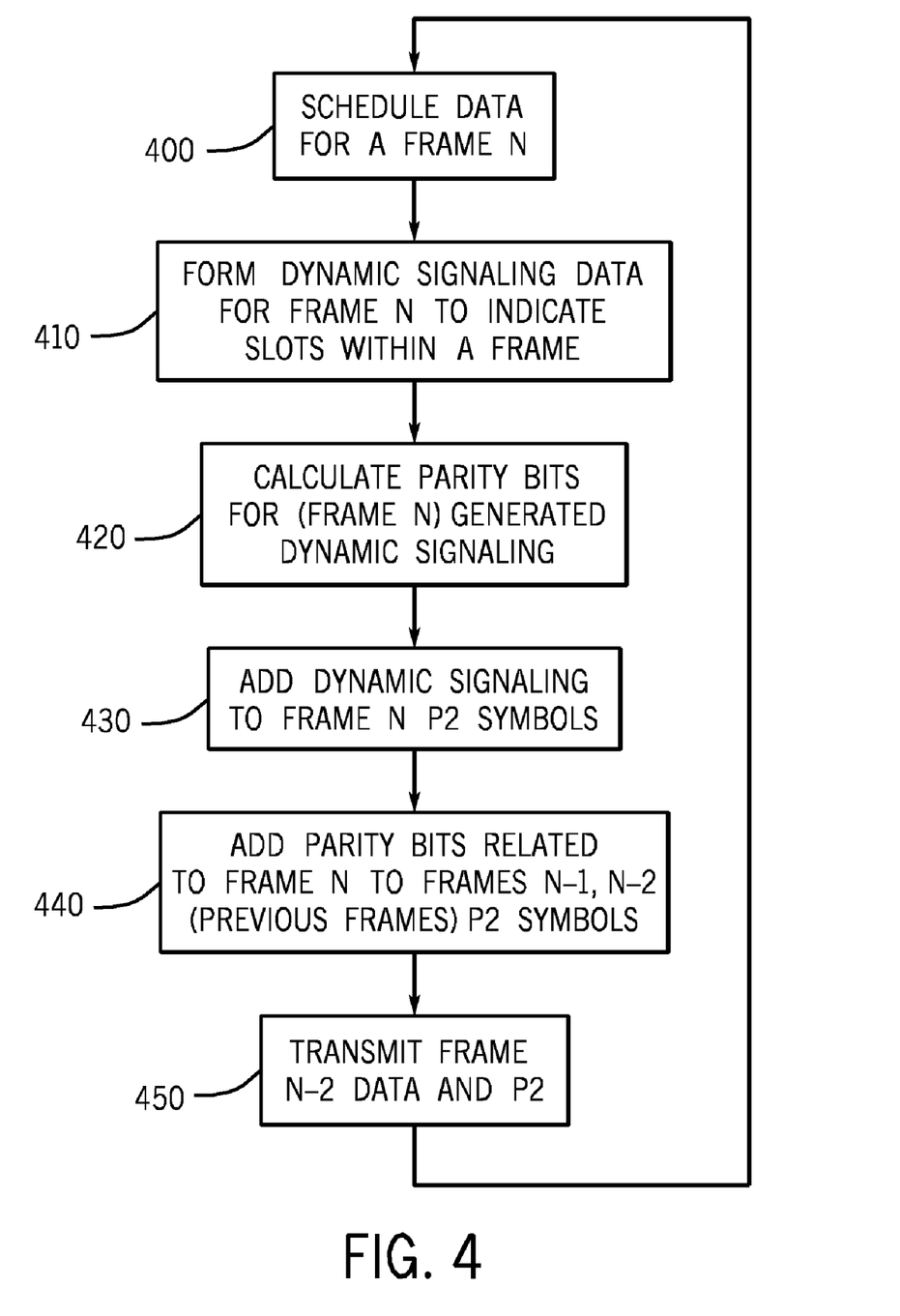
FIG. 4 is a flow chart depicting a simplified transmitter operation for the dynamic signaling of data and the introduction of error correction information to P2 symbols.

FIG. 4 is a flow chart depicting a simplified transmitter operation for the dynamic signaling of data and the introduction of error correction information to P2 symbols, where error correction data is provided in two frames preceding the frame within which the P2 signal is being transmitted. At 400 in FIG. 4, data is scheduled for a particular frame N. At 410, dynamic signaling data is formed for the frame N so as to indicate slots within a frame. At 420, parity bits are calculated for (frame N) generated dynamic signaling. At 430, the dynamic signaling is added to P2 symbols for frame N. At 440, parity bits related to frame N are added to P2 signals for previous frames, e.g., P2 signals for frames N−1 and N−2. At 450, frame N−2 data and the P2 signal for frame N−2 is transmitted. This process then repeats for frame N+1, etc.

Figure 5:
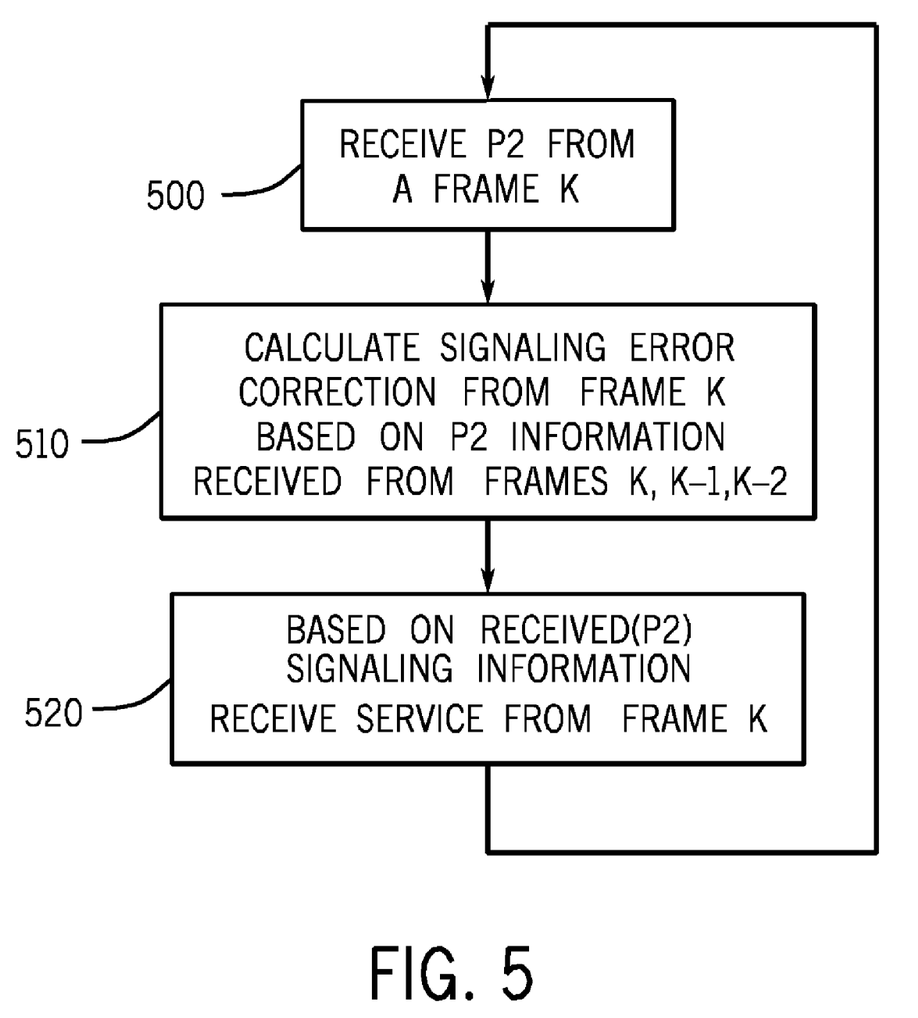
FIG. 5 is a flow chart depicting a simplified receiver operation for processing dynamic signaling data from P2 symbols, error correction information, and data reception based on received dynamic signaling data.

FIG. 5 is a flow chart depicting a simplified example receiver operation for processing dynamic signaling data from P2 symbols, error correction information, and data reception based on received dynamic signaling data. At 500 in FIG. 2, the receiver receives a pilot signal P2 from a frame K. At 510, the receiver calculates a signaling error correction for the frame K based on P2 information that was received from frames K, K−1 and K−2. At 520 and based on the received P2 signaling information, the receiver receives the service from frame K.

Figure 6:
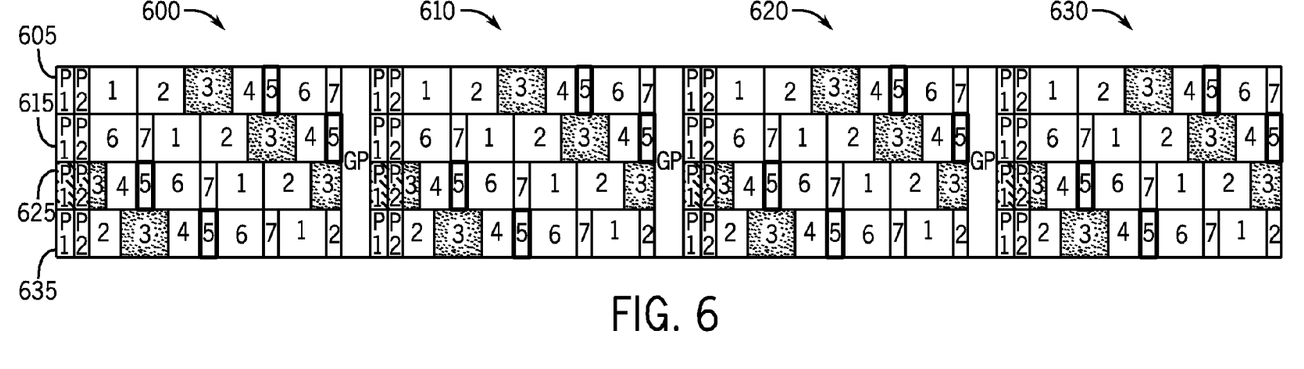
FIG. 6 is a representation showing the scheduling of seven services in a four-frequency scenario when no rotation is introduced between frames.
Figure 7:
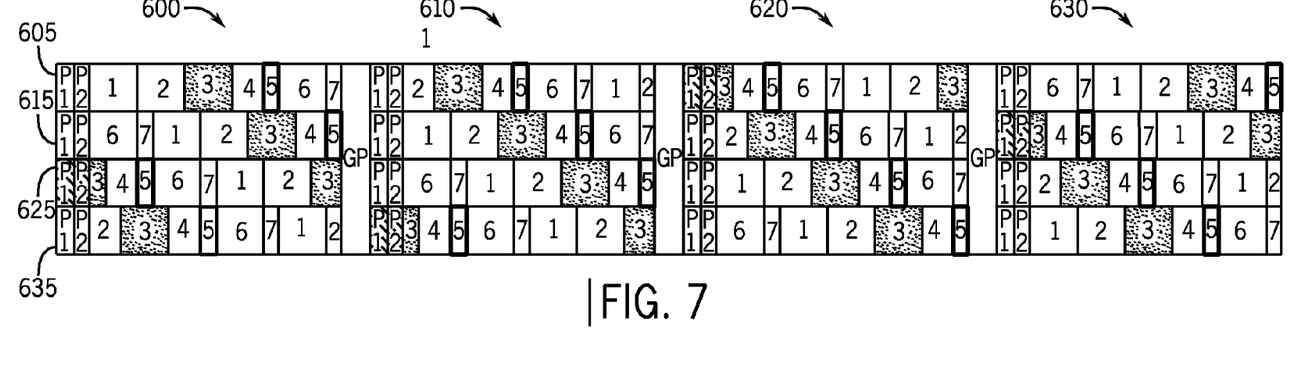
FIG. 7 is a representation showing the scheduling of seven services in a four-frequency scenario when a rotation is introduced between frames.

In various embodiments, transmitted services are scheduled such that services will rotate or "move" between frames, thereby ensuring that a first slot for a service is not always transmitted in the same frequency. The effect of such a scheduling arrangement is shown when comparing FIGS. 6 and 7. FIG. 6 is a representation showing the scheduling of seven services (numbered 1 through 7) in a four-frequency scenario, with first, second, third and fourth frequencies 605, 615, 625 and 635, when no rotation is introduced among first, second, third and fourth frames 600, 610, 620 and 630. FIG. 7 is a representation showing the scheduling of the same seven services in the same four-frequency scenario when a rotation is introduced among the first, second, third and fourth frames 600, 610, 620 and 630. In FIG. 6, the P1 and P2 symbols are always received at the same frequency. In contrast, in FIG. 7 the P1 and P2 symbols are received at different frequencies among the first, second, third and fourth frames 600, 610, 620 and 630.

Figure 8:
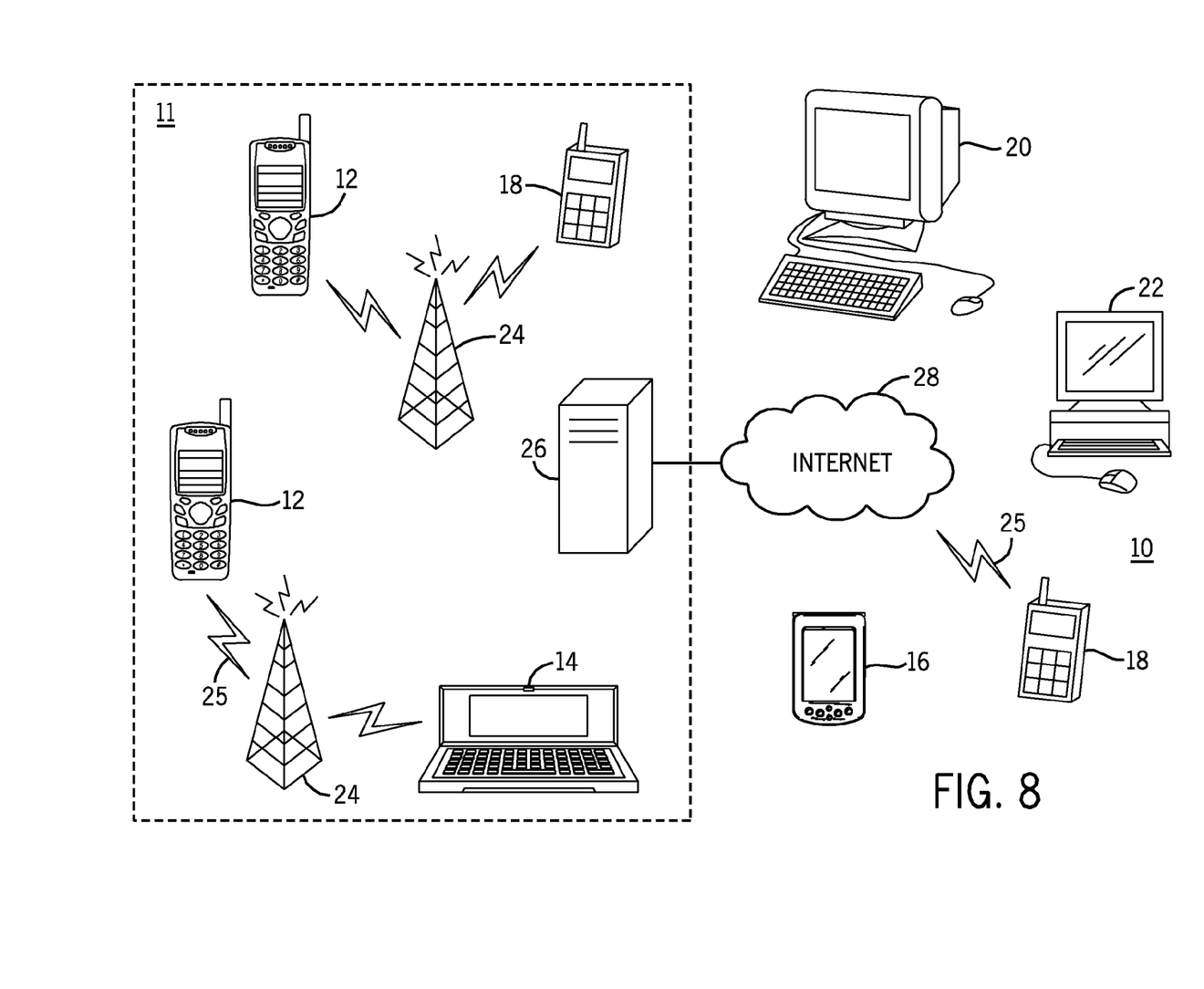
FIG. 8 is an overview diagram of a system within which various embodiments of the present invention may be implemented.

FIG. 8 shows a system 10 including a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like. The exemplary communication devices of the system 10 may include, but are not limited to, a mobile device 12, a combination PDA and mobile telephone 14, a PDA 16, an integrated messaging device (IMD) 18, a desktop computer 21, and a notebook computer 22. Such devices can be utilize OBEX to exchange binary data as described above. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 9:
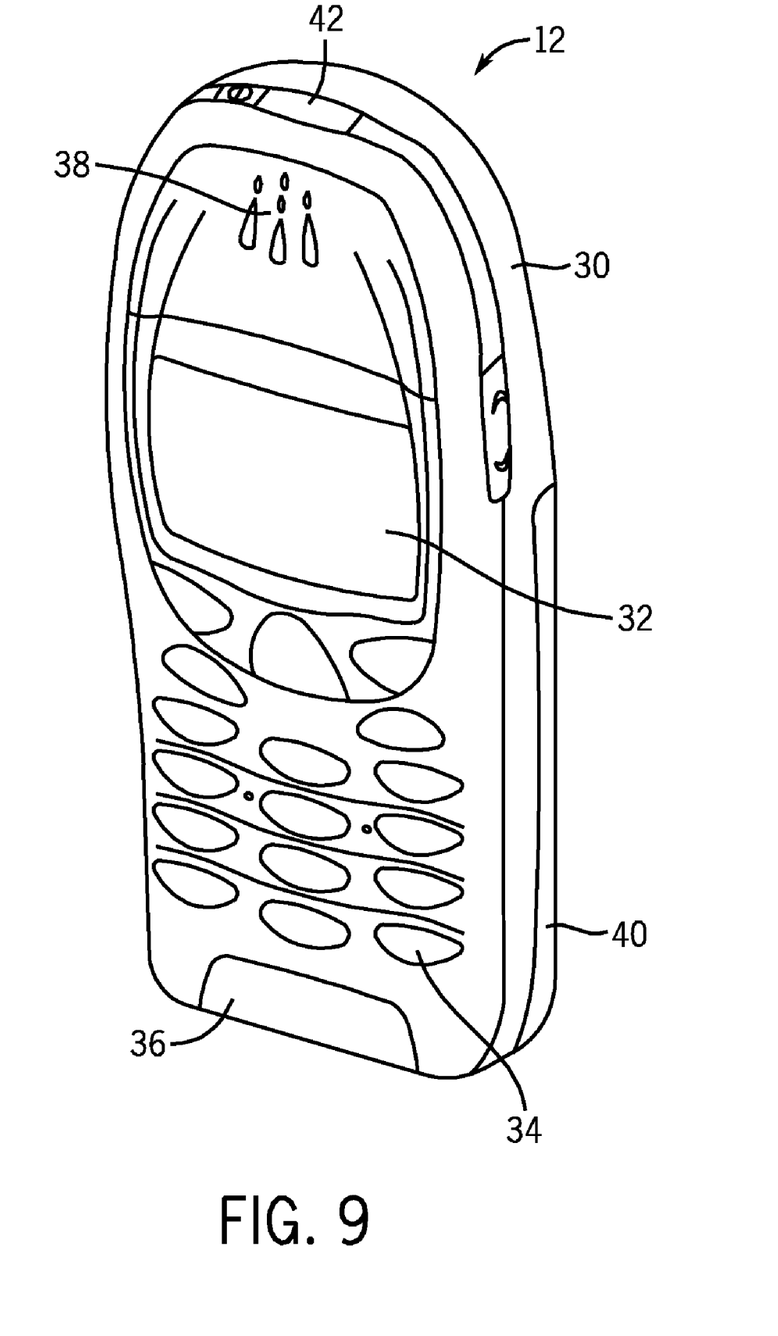
FIG. 9 is a perspective view of an electronic device that can be used in conjunction with the implementation of various embodiments of the present invention.
Figure 10:
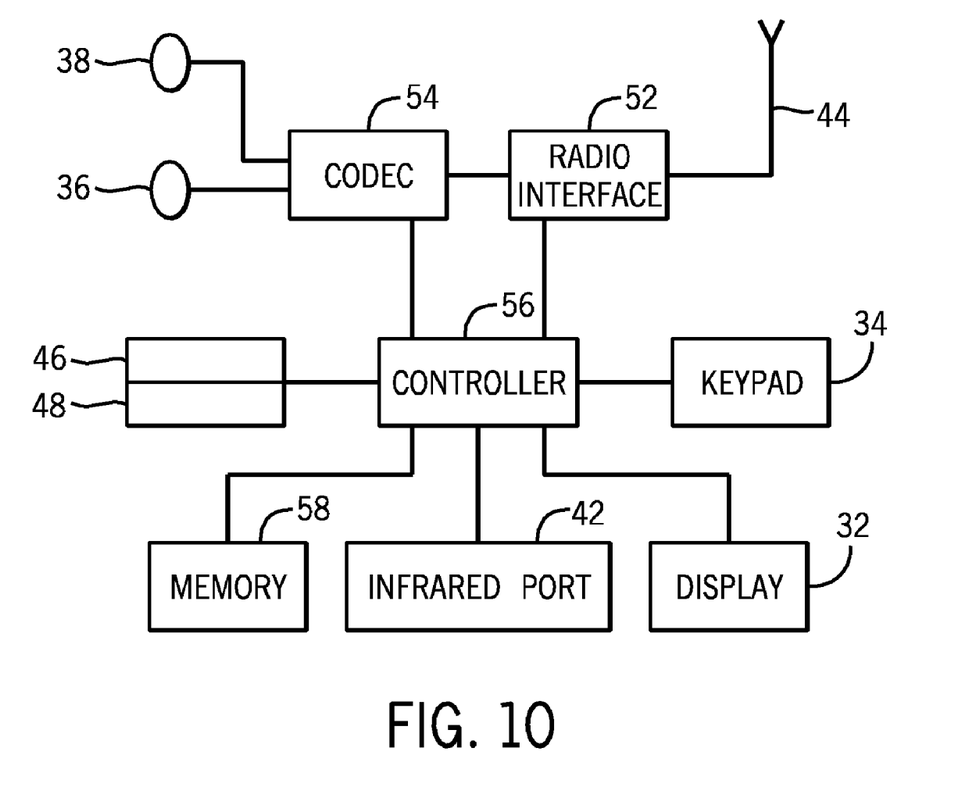
FIG. 10 is a schematic representation of the circuitry which may be included in the electronic device of FIG. 9.

FIGS. 9 and 10 show one representative mobile device 12 within which various embodiments may be implemented. It should be understood, however, that the present invention is not intended to be limited to one particular type of electronic device. The mobile device 12 of FIGS. 9 and 10 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
preparing dynamic data for transmission in a pilot symbol of a particular frame;
preparing error correction data relating to the dynamic data for transmission;
including at least a portion of the error correction data in a corresponding pilot symbol of at least one prior frame occurring before the particular frame;
causing the transmission of the at least one prior frame; and
causing the transmission of the particular frame including the dynamic data.

2. The method of claim 1, wherein all of the error correction data is included in the corresponding pilot symbol of the at least one prior frame.

3. The method of claim 1, wherein a portion of the error correction data is included in the pilot symbol of the particular frame.

4. The method of claim 1, wherein at least a portion of the error correction data is included in the corresponding pilot symbol of a plurality of previous frames.

5. The method of claim 1, wherein at least a portion of the error correction data is included in the at least one prior frame for transmission on a frequency that is different than the frequency upon which the particular frame is transmitted.

6. The method of claim 1, further comprising:
preparing second dynamic data for transmission in a subsequent frame in an additional corresponding pilot symbol;
preparing second error correction data relating to the second dynamic data for transmission; and
before transmitting the particular frame, including at least a portion of the second error correction data in the pilot symbol of the particular frame.

7. A non-transitory computer-readable medium having computer executable instructions stored thereon, that when executed by a processor, cause an apparatus to:
prepare dynamic data for transmission in a pilot symbol of a particular frame;
prepare error correction data relating to the dynamic data for transmission;
include at least a portion of the error correction data in a corresponding pilot symbol of at least one prior frame occurring before the particular frame;
cause the transmission of the at least one prior frame; and
cause the transmission of the particular frame including the dynamic data.

8. An apparatus, comprising:
a processor; and
memory having computer code stored therein, that when executed by the processor, causes the apparatus to:
prepare dynamic data for transmission in a pilot symbol of a particular frame;
prepare error correction data relating to the dynamic data for transmission;
include at least a portion of the error correction data in a corresponding pilot symbol of at least one prior frame occurring before the particular frame;
cause the transmission of the at least one prior frame; and
cause the transmission of the particular frame including the dynamic data.

9. The apparatus of claim 8, wherein all of the error correction data is included in the corresponding pilot symbol of the at least one prior frame.

10. The apparatus of claim 8, wherein a portion of the error correction data is included in the pilot symbol of the particular frame.

11. The apparatus of claim 8, wherein at least a portion of the error correction data is included in the corresponding pilot symbol of a plurality of previous frames.

12. The apparatus of claim 8, wherein at least a portion of the error correction data is included in the at least one prior frame for transmission on a frequency that is different than the frequency upon which the particular frame is transmitted.

13. The apparatus of claim 8, wherein the computer code, when executed by the processor, further causes the apparatus to:
   prepare second dynamic data for transmission in a subsequent frame in an additional corresponding pilot symbol;
   prepare second error correction data relating to the second dynamic data for transmission; and
   before transmitting the particular frame, include at least a portion of the second error correction data in the pilot symbol of the particular frame.

14. An apparatus, comprising:
   means for preparing dynamic data for transmission in a pilot symbol of a particular frame;
   means for preparing error correction data relating to the dynamic data for transmission;
   means for including at least a portion of the error correction data in a corresponding pilot symbol of at least one prior frame occurring before the particular frame;
   means for transmitting the at least one prior frame; and
   means for transmitting the particular frame including the dynamic data.

15. The apparatus of claim 14, wherein at least a portion of the error correction data is included in the at least one prior frame for transmission on a frequency that is different than the frequency upon which the particular frame is transmitted.

16. The non-transitory computer-readable medium of claim 7, wherein all of the error correction data is included in the corresponding pilot symbol of the at least one prior frame.

17. The non-transitory computer-readable medium of claim 7, wherein a portion of the error correction data is included in the pilot symbol of the particular frame.

18. The non-transitory computer-readable medium of claim 7, wherein at least a portion of the error correction data is included in the corresponding pilot symbol of a plurality of previous frames.

19. The non-transitory computer-readable medium of claim 7, wherein at least a portion of the error correction data is included in the at least one prior frame for transmission on a frequency that is different than the frequency upon which the particular frame is transmitted.

20. The non-transitory computer-readable medium of claim 7, wherein the computer executable instructions stored thereon, when executed by a processor, further cause an apparatus to:
   prepare second dynamic data for transmission in a subsequent frame in an additional corresponding pilot symbol;
   prepare second error correction data relating to the second dynamic data for transmission; and
   before transmitting the particular frame, include at least a portion of the second error correction data in the pilot symbol of the particular frame.

* * * * *